Jan. 25, 1966    E. C. TROY    3,231,146
CONTROLLED RATE DISCHARGE DEVICE
Filed April 2, 1964    2 Sheets-Sheet 1

INVENTOR.
ELBERT C. TROY
BY Mason, Kolehmainen,
Rathburn & Wyss.
ATTORNEYS

Jan. 25, 1966 E. C. TROY 3,231,146
CONTROLLED RATE DISCHARGE DEVICE
Filed April 2, 1964 2 Sheets-Sheet 2
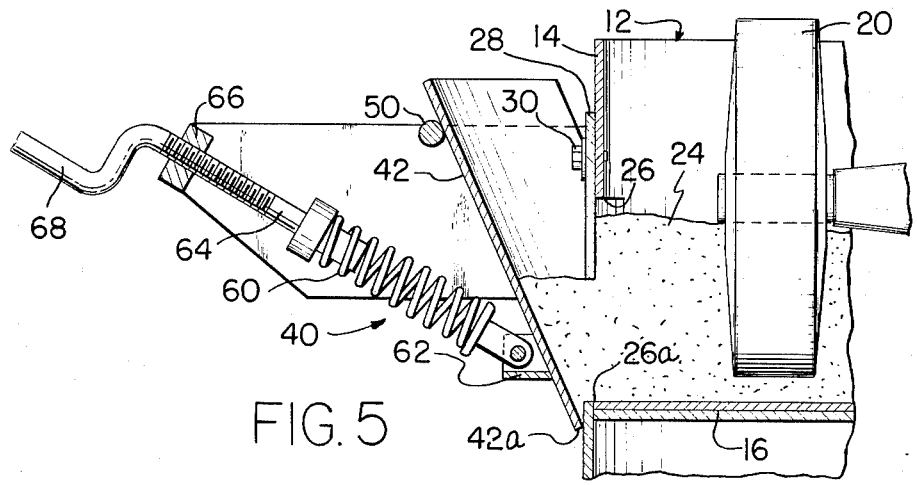
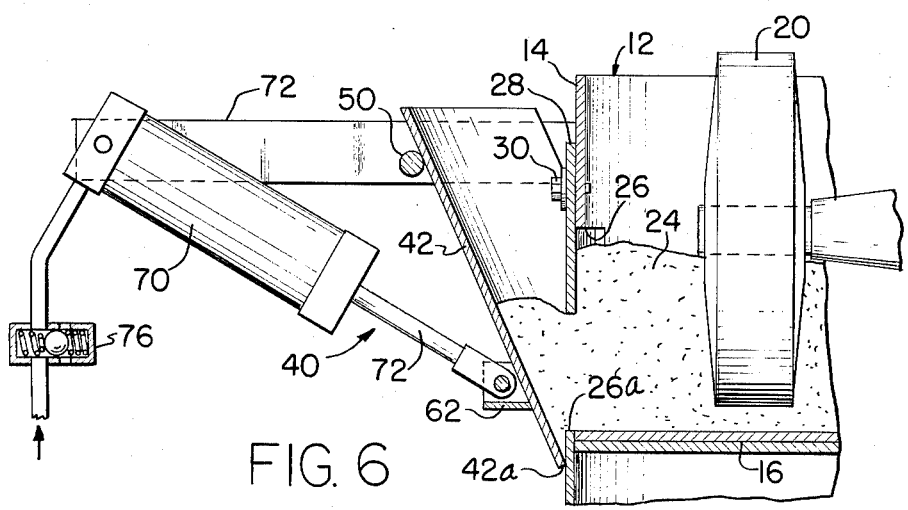
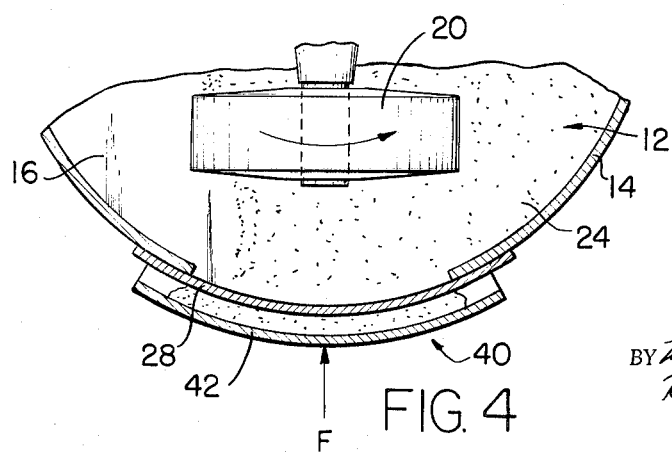
INVENTOR.
ELBERT C. TROY
BY Wason, Kolehmainen,
Rathburn & Wyss.
ATTORNEYS United States Patent Office 3,231,146
Patented Jan. 25, 1966

3,231,146
CONTROLLED RATE DISCHARGE DEVICE
Elbert C. Troy, Highland Park, Ill., assignor to Herbert Simpson Corporation, Chicago, Ill., a corporation of Illinois
Filed Apr. 2, 1964, Ser. No. 356,708
12 Claims. (Cl. 222—233)

The present invention relates to controlled rate discharge devices for controlling the discharge of material from mixing machines and other equipment. More specifically, the discharge device of the present invention is adapted for use in controlling the discharge of material from mulling machines such as those described in U.S. Patent Nos. 2,970,778, 2,978,147 and Re. 25,475, now Patent No. 3,081,821, which patents are assigned to the same assignee as the present invention.

It is an object of the present invention to provide a new and improved discharge device for controlling the discharge of material from mixers and the like which opens in response to the pressure of the material and is self-regulating to control the rate of discharge in accordance with the pressure of the material.

Another object of the present invention is to provide a new and improved discharge device of the type described which is selectively adjustable to provide the desired discharge rate when a predetermined pressure head of material in the mixer is present.

Another object of the present invention is to provide a new and improved discharge device for a mixer which enables the mixer to be utilized in a continuous or semi-continuous system instead of being limited to a batch type operation.

More specifically it is another object of the present invention to provide a new and improved discharge device for a mixer in which material is added to the mixer in batches from time to time wherein the discharge device provides for a continuous discharge from the mixer of only the thoroughly mixed material and prevents the discharge of unmixed lumps and floating materials until this material has been properly mixed.

Yet another object of the present invention is the provision of a new and improved discharge door which prevents a premature discharge of material from a mixing machine or the like until the desired amount of mixing of the material has been accomplished.

A further object of the present invention is the provision of a new and improved discharge device of the type described which provides a continual material seal around the discharge opening of the mixer preventing the ingress of air through the opening into the mixer and the egress of fumes, dust or other noxious vapors from the mixer into the atmosphere.

A still further object of the present invention is the provision of a new and improved discharge device of the type described which prevents the discharge from the mixer of undesirable floating lumps or agglomerates of material which have not been sufficiently broken up or mixed.

Yet another object of the present invention is the provision of a new and improved discharge device of the type described which provides for controlled rate discharge of thoroughly mixed material near the bottom of the mixer while preventing the discharge of lumpy agglomerates of material which tend to float toward the upper surface of the material in the mixer.

Still another object of the present invention is the provision of a new and improved discharge device of the type described in which means are provided for opposing the discharge of material from the mixer at a relatively constant force over a relatively wide range of discharge rates.

The foregoing and other objects and advantages of the present invention are accomplished by the provision of a new and improved discharge device for controlling the discharge of material from an opening in an upstanding wall of a mixer or other material containing chamber comprising door means facing the opening and having a lower edge adapted to closely face the lower edge of the opening. The door means is disposed to slope upwardly and outwardly away from the wall of the mixer and mounting means are provided for supporting the upper portion of the door to pivot about an axis spaced outwardly from the mixer wall. Bias means are provided for biasing the lower portion of the door toward the opening against the outward pressure of the material in the mixer as it tends to move outwardly through the opening. The bias means is selectively adjustable to open away from the discharge opening to allow downward discharge therefrom at the desired rate when the outward pressure of the material reaches or exceeds a predetermined amount. The outward and upward slope of the door provides a means for entrapping the material tending to float toward the upper surface of the mixture and forms a continuous material seal to prevent air from flowing into the mixer through the opening and dust, gases, or fumes in the mixer from escaping to the atmosphere.

For a better understanding of the invention, reference should be had to the following detailed description and drawings, in which:

FIG. 4 is a horizontal sectional view taken substantially along lines 4—4 of FIG. 1;

FIG. 5 is a sectional view similar to FIG. 2 illustrating another form of bias means for biasing the device toward a closed position;

FIG. 6 is a sectional view similar to FIG. 2 illustrating yet another form of bias means for biasing the device toward a closed position.

Figure 1:
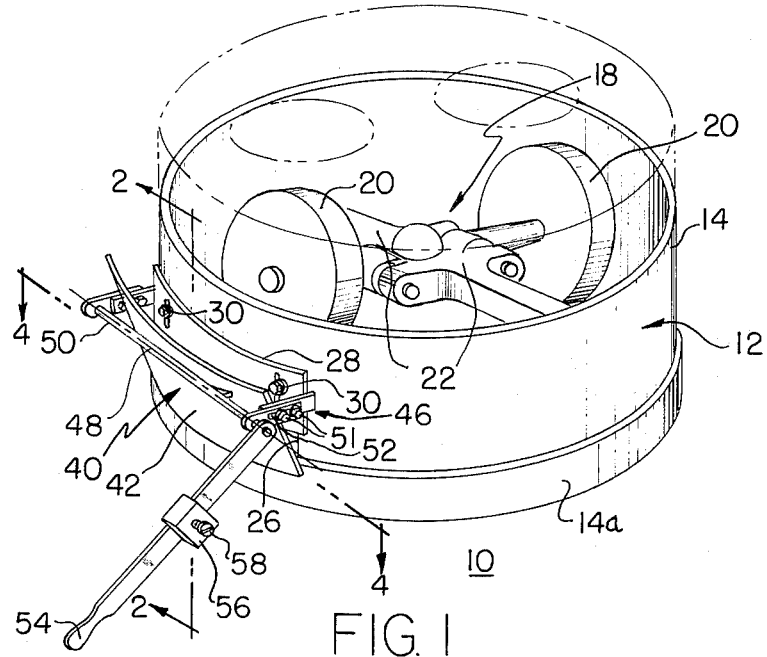
FIG. 1 is a perspective view illustrating the discharge device of the present invention used with a rotary type mulling machine.

Referring now to the drawings, in FIG. 1 there is illustrated a mixing machine 10 of the type generally disclosed in the aforementioned U.S. patents which includes a material receiving crib or chamber 12 having a cylindrical upstanding side wall 14 and a bottom wall or wear plate 16. Within the chamber 12 there is provided a rotating mixing head assembly 18 which is mounted for rotation about a central vertical axis in the chamber. The mixing head assembly includes a pair of mulling wheels 20 for grinding and pulverizing the material in the chamber upon rotation of the mixing head assembly. Scraper blade supporting arms 22 extending generally normal to the axes of the wheels 20 are provided for carrying scraper blades, not shown, which mix the material and move it into the pair of mulling wheels. The chamber 12 is adapted to contain a quantity of sand 24 or other material which is to be mixed and pulverized during operation of the machine. In the side wall 14 of the chamber there is provided a discharge opening 26 having a lower edge 26a which is coincident with the upper surface of the wear plate 16. The size of the opening 26 is sufficient to provide for the desired discharge rate needed and a slidable gate 28 is secured to the wall 14 of the chamber by bolts 30 and is adjustable to a variety of selected positions to control the effective area of the opening 26. By loosening the bolts 30, the gate 28 can be moved upwardly or downwardly to the desired position and the bolts then retightened to secure the gate and provide the desired effective area for discharge of material from the chamber 12.

Figure 2:
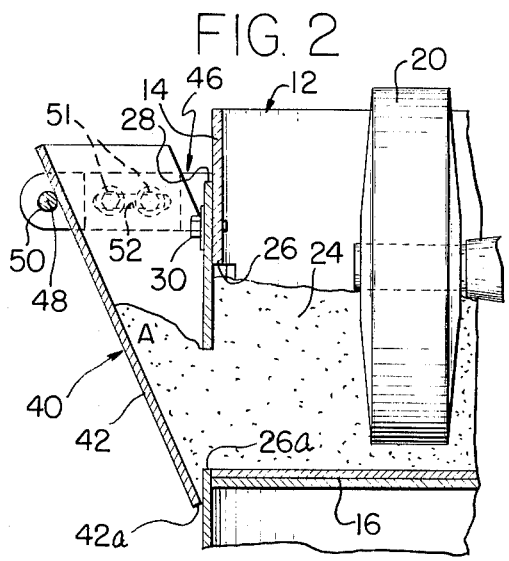
FIG. 2 is a vertical sectional view taken substantially along lines 2—2 of FIG. 1 and illustrating the device in a closed position.

In order to control the discharge of material through the opening 26 at a selected discharge rate, a controlled rate discharge device indicated generally by the numeral 40 is provided adjacent the opening 26. The discharge device 40 includes a door 42 which faces the opening 26 in the wall 14 of the chamber. The door 42 is greater in horizontal width than the horizontal width of the opening by an amount larger than the angle of repose of the material in the mixer so that material generally will not leak out along the side edges of the opening when in a closed position as shown in FIG. 2. The door 42 is dimensioned so that a lower edge 42a thereof is disposed at or below the bottom edge 26a of the opening in the mixer wall when the door 42 is in a closed position as shown in FIG. 2, the lower edge 42a thereof abuts a lower side wall 14a of the chamber and closely faces the lower edge 26a of the discharge opening. The door 42 is provided with a horizontal cross section which is curved to substantially conform to the curvature of the chamber wall 14 and the door is disposed to slope upwardly and outwardly away from the discharge opening 26 in the mixer wall.

Adjustable bracket means 46, which are secured to the wall 14 of the mixer, are provided to pivotally support the door 42 for movement about a pivot axis 48 which is spaced outwardly from and above the discharge opening. Brackets 46 are adjustable so that the spacing of the axis 48 from the wall 14 can be adjusted as necessary to provide the desired angle of slope for the door 42 when it is in a closed position. Bolts 50 and slots 52 are provided in the brackets 46 to accomplish the adjustment of the brackets for the desired spacing.

The upper portion of the door 42 is carried by an axial pin 50 which is welded thereto and is pivotally mounted in openings provided in the outer ends of the brackets 46.

Figure 3:
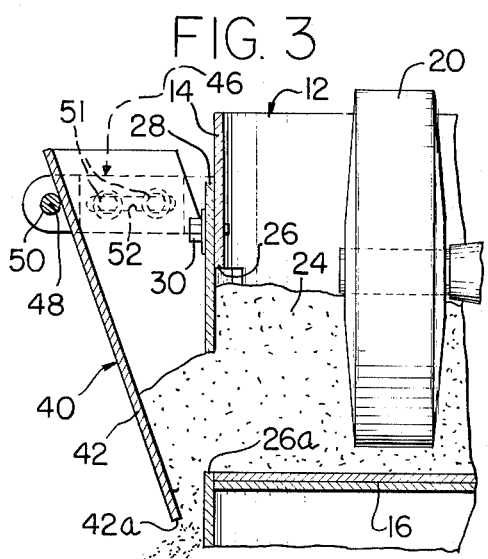
FIG. 3 is a sectional view similar to FIG. 2 but showing the device in a partially open position for discharging material from the mixer.

In FIG. 1 there is illustrated one embodiment of the present invention which includes the lever arm 54 secured to the outer end of the rod 50 and a weight 56 is adjustably secured on the arm 54 by means of a set screw 58 so that the door 42 will be biased inwardly toward the opening 26 with the desired amount of force by adjusting the position of the weight 56. The inward biasing force on the door 42 is adjusted by positioning the weight 56 on the arm 54 to maintain the door in the closed position of FIG. 2 until the outward pressure of the material 24 in the chamber reaches a selected amount. The outward pressure of the material 24 is dependent on the height of material in the chamber 12, the density of the material and the centrifuging action on the material by the rotating mixing head 18. When this outward pressure of material flowing through the opening 26 in the mixer wall 12 reaches an amount sufficient to overcome the inward biasing force on the door caused by the weight 56, the lower portion of the door will pivot outwardly away from the wall of the mixer allowing material therein to be discharged downwardly as shown in FIG. 3. By adjusting the position of the weight 56 on the arm 54 the inward biasing force on the door 42 can be set so that the door will open only when the outward pressure of the material 24 on the door reaches a predetermined value. Since the outward pressure of the material is dependent on the height of the material and the density of the material, the door will not be opened until sufficient height of material in the chamber has been obtained. After sufficient mixing is accomplished in the mixer, and lumps are broken up into smaller pieces the density of the material will increase. Hence, the biasing force can be adjusted so that the door will remain closed until the density of the material has been increased to the desired amount as indicative of the amount of mixing that has occurred within the chamber.

It has been found that some of the unmixed lumps or agglomerates tend to float toward the top of the mixture in the chamber. Until these lumps or agglomerates are broken up sufficiently they will not exert enough pressure on the door 42 to open it for discharge. Even, if some of these lumps should pass out through the opening 26, they are not exerting enough pressure on the door to cause it to open and these lumps will tend to ride upwardly upon engagement with the sloping door to the region above the lower edge of the adjustable gate 28 indicated as "A" in FIG. 1. The material in the region "A" forms an air seal above the discharge opening 26 of the wall 14 and prevents air from entering the mixer through the opening and conversely prevents fumes, dust and noxious vapors in the mixer from escaping to the atmosphere. Because of the upward and outward slope of the door, even when it is in an open position as shown in FIG. 3 with material discharging downwardly as shown, the air seal above the opening 26 can be continually maintained by proper adjustment of the brackets 46 to obtain the desired slope on the door. As material discharges from the mixer as shown in FIG. 3, the outward pressure thereof will decrease and the door will tend to move inwardly to a closed position under the force exerted by the biasing weight 56. Thus the rate of discharge from the mixer is continually regulated to a given amount and material newly added in the mixer will not be allowed to pass the discharge until it has been thoroughly mixed as before described. The desired discharge rate and mixing retention time in the mixer can be accurately controlled by adjustment of the brackets 46 and adjustment of the position of the weight 56 to effect the desired result. By providing the desired angle of slope on the door 42 for any specific material, an air seal above the discharge opening can continually be maintained even though the specific materials may have widely varying angles of repose and fluidity. Also the controlled rate discharge device of the present invention makes it possible for a mixer of the type described to be utilized for a continuous operating cycle rather than a batch type operation since control over the retention time of the material in the mixer can be obtained thus allowing continuous discharge while material is fed into the mixer in batches. The amount of the opening of the door 42 is responsive to the head or pressure of the material in the mixer and the discharge rate therefrom can thus be continually controlled.

Referring now to the embodiment illustrated in FIG. 5, there is shown another means for applying a selectively adjustable biasing force against the lower portion of the door 42 to obtain the desired discharge flow characteristics as before described. In this embodiment a coil spring 60 having one end pivotally connected to a bracket 62 secured to the lower portion of the door 42 is provided for effecting the desired inward biasing force on the door. The outer end of the spring 60 is connected to a crank rod 64 which is threadedly received in a bracket 66 supported from the side wall 14 of the mixer. The outer end of the crank rod 64 is provided with a concentric handle 68 which can be turned by an operator to produce the desired compression on the spring 60 in order to effect the desired biasing force thereof against the door. With this type of biasing arrangement, outward movement of the lower portion of the door is opposed by ever increasing force due to the compression of the spring 60, a characteristic which may be desirable to effect the desired flow rate control of material discharging from the mixer.

Referring now to the embodiment of FIG. 6, there is illustrated another means for providing an inward biasing force against the lower portion of the door 42. This means includes a pneumatic cylinder 70 and rod 72 extending therefrom, the outer end of which is pivotally secured to the bracket 62 on the lower portion of the door 42. The outer end of the cylinder 70 is pivotally supported on a bracket 72 shown in dotted lines which is secured to the wall 14 of the mixer. Compressed air is supplied to the outer end of the piston within the cylinder 70 by means of a conduit 74 which is connected to a suitable source of compressed air such as a compressor or tank, now shown in the drawings. A relief valve 76 is provided in the conduit 74 so that the pressure acting against the outer end of the piston of the cylinder 70 will be maintained at a selected level. Thus, in the embodiment shown in FIG. 6 the biasing force of the rod 72 against the door may be maintained at a constant value regardless of the amount of opening of the door 42. This feature is highly desirable in some instances rather than an increasing biasing force on the door as it opens more fully. It should also be noted that weight 56 on the arm 52 as shown in the embodiment of FIG. 1 can be positioned on the arm to provide either an increasing biasing force as the door 42 opens, a relatively constant biasing force, or decreasing force as the specific material and installation might require.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent of the United States is:

1. In combination with a material containing chamber having a discharge opening in a wall thereof, apparatus for controlling the discharge of material through said opening comprising door means facing said opening and extending upwardly and outwardly from said wall, said door means having a lower edge portion adapted to closely face a lower edge of said opening and extending transversely beyond side edges of said opening, means pivotally mounting said door means on said chamber for movement of the lower edge portion thereof toward and away from said opening, and means for biasing said door means toward said opening against the pressure of said material.

2. Apparatus as defined in claim 1 wherein the lower edge of said door means extends below the lower edge of said opening.

3. Apparatus as defined in claim 2 wherein said door means extends outwardly and upwardly from the lower edge of said opening.

4. Apparatus as defined in claim 1 including a movable gate for adjusting the size of said opening.

5. Apparatus as defined in claim 1 including means for adjusting said pivotal mounting means to provide selected angles of upslope between said door means and said wall when the lower edge portion of said door means is in a closed position closely facing said opening.

6. Apparatus for mixing material comprising a material containing mixing chamber having an upstanding cylindrical side wall with a discharge opening defined therein, means for mixing and moving said material around said chamber, door means exteriorly of said chamber facing said opening and extending upwardly and outwardly from said wall, said door means having a lower edge adapted to closely face a lower edge of said opening and extending transversely beyond side edges of said opening, means pivotally mounting said door means on said chamber for movement of the lower edge thereof toward and away from said opening, and means for biasing said door means toward said opening against the pressure of said material.

7. Apparatus as defined in claim 6 wherein the lower edge of said door means extends below the lower edge of said opening.

8. Apparatus as defined in claim 6 including gate means movable on said side wall to selected positions for adjusting the size of said opening.

9. Apparatus as defined in claim 6 wherein said door means is formed with curved transverse cross section substantially conforming to an adjacent facing segment of said cylindrical side wall.

10. Apparatus as defined in claim 6 including means for adjusting said pivotal mounting means to provide selected angles of upslope between said door means and said wall when the lower edge portion of said door means is in a closed position closely facing the lower edge of said opening.

11. In combination with a material containing chamber having a discharge opening in a wall thereof, a device for regulating the discharge of material through said opening comprising a door having an inner surface facing said opening in contact with material in said chamber, said inner surface including an edge portion overlapping said opening and facing a portion of said wall adjacent thereto in selected spaced relation therefrom whereby a seal of material is formed between said edge portion and said opening, and means mounting said door for movement relative to said opening to increase said selected spaced relation permitting the discharge of said material through an opening between said edge portion and said wall.

12. Apparatus as defined in claim 11 wherein said door is pivotally movable relative to said opening to increase said selected spaced relation for discharging of said material.

References Cited by the Examiner

UNITED STATES PATENTS 2,368,114    1/1945    Cartlidge _____ 214—83.18

LOUIS J. DEMBO, Primary Examiner.

HADD S. LANE, Examiner.